United States Patent
Ono

(10) Patent No.: US 8,268,929 B2
(45) Date of Patent: Sep. 18, 2012

(54) RESIN COMPOSITION

(75) Inventor: Naoyuki Ono, Tokyo (JP)

(73) Assignee: Riken Technos Corporation, Tokyo (JP)

( * ) Notice: Subject to any disclaimer, the term of this patent is extended or adjusted under 35 U.S.C. 154(b) by 593 days.

(21) Appl. No.: 11/729,830

(22) Filed: Mar. 30, 2007

(65) Prior Publication Data

US 2007/0203295 A1 Aug. 30, 2007

(51) Int. Cl.
*C08J 3/22* (2006.01)

(52) U.S. Cl. ........ 525/132; 525/134; 525/136; 525/137; 525/138; 525/140; 525/145

(58) Field of Classification Search .................. 525/134, 525/143

See application file for complete search history.

(56) References Cited

U.S. PATENT DOCUMENTS

| | | | | |
|---|---|---|---|---|
| 3,862,106 | A * | 1/1975 | Fischer | 526/348 |
| 4,311,628 | A * | 1/1982 | Abdou-Sabet et al. | 524/447 |
| 4,707,519 | A * | 11/1987 | Forti et al. | 525/133 |
| 5,489,650 | A * | 2/1996 | Ainsworth et al. | 525/240 |
| 5,714,545 | A * | 2/1998 | Lee et al. | 525/193 |
| 5,900,465 | A * | 5/1999 | Nishikawa et al. | 525/98 |
| 6,559,234 | B1 * | 5/2003 | Arai et al. | 525/245 |
| 2007/0203295 | A1 * | 8/2007 | Ono | 525/132 |

FOREIGN PATENT DOCUMENTS

| JP | A-63-112649 | 5/1988 |
|---|---|---|
| JP | A-09-012839 | 1/1997 |

OTHER PUBLICATIONS

Feb. 15, 2010 Japanese Office Action issued in Japanese Patent Application No. 2005-099482 (with translation).

* cited by examiner

*Primary Examiner* — Marc Zimmer
(74) *Attorney, Agent, or Firm* — Oliff & Berridge, PLC

(57) ABSTRACT

A resin composition comprises (a) 100 parts by weight of at least one compound selected from the group consisting of phenol resins and brominated phenol resins, (b) 20 to 500 parts by weight of a crystalline olefin resin, provides that copolymers of ethylene with unsaturated carboxylic acid ester or vinyl acetate are precluded, and (c) 0 to 300 parts by weight of a non-aromatic softening agent for rubber. The resin composition is easy to handle in dynamic cross-linking of rubber or a thermoplastic elastomer to give uniform cross-linking. A cross-linked rubber composition or thermoplastic elastomer composition has improved compression set and moldability.

11 Claims, No Drawings

RESIN COMPOSITION

TECHNICAL FIELD OF THE INVENTION

The present invention relates to a resin composition containing a phenol resin cross-linking agent. In particular, the present invention relates to a resin composition which is used in cross-linking of rubber or in dynamic cross-linking of a thermoplastic elastomer and is easy to handle, attains uniform cross-linking and can improve compression set and molding properties of a cross-linked rubber composition or thermoplastic elastomer composition. Further, the present invention relates to a rubber composition or thermoplastic elastomer composition containing this resin composition.

PRIOR ART

Recently, thermoplastic elastomers that are soft materials having rubbery elasticity, that needs to be vulcanized and have similar molding processability as that of thermoplastic resins, and that can also be recycled are much used in the fields of automobile parts, parts of household electric appliances, electric wire coverings, medical parts, footwear, and miscellaneous goods.

Among the thermoplastic elastomers, the styrene series of thermoplastic elastomers such as styrene-butadiene block copolymers (SBS) and styrene-isoprene block copolymers (SIS) that are block copolymers of an aromatic vinyl compound and conjugated diene are highly flexible and has good rubbery elasticity at ambient temperature. Thermoplastic elastomer compositions prepared from it exhibit excellent processability, so that they have been widely used as a constituent for vulcanized rubber.

Further, as those with improved high-temperature compression set and oil resistance, many thermoplastic elastomer compositions are known which are prepared by dynamic cross-linking of a composition comprising an olefin resin and olefin copolymeric rubber. For the thermoplastic elastomer, those which are cross-linked with a phenol resin have been widely used.

However, such phenol resins are hard and brittle to cause a problem that powder dust generates in working. Then, a master batch of a phenol resin was proposed. However, such was supplied in a form of plate form, but not in a form of pellet. Therefore, they are difficult to meter so that they are not suitable for blending with a thermoplastic elastomer or blending with rubber.

Rubberuch as butyl rubber is used as a principle component in such a master batch of the phenol resin as seen in Japanese Patent Application Laid-Open No. Hei-9-12839/1997. Since a rubber component such as butyl rubber is cross-linked with a phenol resin. If such a master batch is used in blending (dynamic cross-linking) with a thermoplastic elastomer, cross-linking of the rubber occurs in the master batch prior to dispersion of the master batch to cause a problem that uniform cross-linking over the entire blend cannot be attained.
[Reference Document 1] Japanese Patent Application Laid-Open No. Hei-9-12839/1997

DISCLOSURE OF THE INVENTION

Problems to Be Solved by the Invention

The object of the present invention is to provide a resin composition containing a phenol resin cross-linking agent which is easy to handle and does not show the aforementioned drawbacks in cross-linking of rubber or in dynamic cross-linking of a thermoplastic elastomer.

Means To Solve the Problems

The present inventors have invented the present invention by combining a phenol resin type of cross-linking agent with a crystalline olefin resin which does not react with the phenol resin.

Thus, the present invention provides
(1) a resin composition, comprising
(a) 100 parts by weight of at least one compound selected from the group consisting of phenol resins and brominated phenol resins,
(b) 20 to 500 parts by weight of a crystalline olefin resin, provides that copolymers of ethylene with unsaturated carboxylic acid ester or vinyl acetate are precluded, and
(c) 0 to 300 parts by weight of a non-aromatic softening agent for rubber.

The following resin compositions may be mentioned as preferred embodiments:
(2) the resin composition as described in (1) above wherein the quantity of component (c) ranges from 50 to 300 parts by weight,
(3) the resin composition as described above in (1) wherein the quantity of component (c) is less than 50 parts by weight,
(4) the resin composition as described in any one of the aforementioned items (1) through (3) wherein component (c) is at least one selected from ethylene homopolymers, propylene homopolymers, ethylene-α-olefin copolymers and propylene-α-olefin copolymers,
(5) the resin composition as described in one of the aforementioned items (1) through (4) wherein component (a) is an alkylphenol formaldehyde resin,
(6) the resin compositions as described in any one of the aforementioned items (1) through (5), wherein the composition further contains a cross-linking promoter (d) in an amount of 200 parts by weight or less, and
(7) a master batch of a cross-linking agent for rubber comprising the resin composition as described in any one of the aforementioned items (1) through (6).

Also, the present invention provides
(8) a rubber composition or thermoplastic elastomer composition, comprising 100 parts by weight of rubber and 1 to 280 parts by weight of the resin composition as described in any one of the aforementioned items (1) through (7).

The following compositions may be mentioned as preferred embodiments:
(9) the compositions as described in (8), wherein the composition further comprises a crystalline olefin resin in an amount of 400 parts by weight or less,
(10) the compositions as described in the aforementioned items (8) or (9), wherein the composition further comprises a cross-linking promoter in an amount of 200 parts by weight or less per 100 parts by weight of component (a), provided that if the resin composition comprises component (d), a total amount of the cross-linking promoter and component (d) is 200 parts by weight or less per 100 parts by weight of component (a),
(11) the compositions as described in one of the aforementioned items (8) through (10), wherein the composition further comprises a non-aromatic softening agent for rubber in an amount of 800 parts by weight or less,
(12) the composition described in one of the aforementioned items (8) through (11), wherein the composition further comprises at least one polymer selected from the group consisting of copolymers of an aromatic vinyl compound with a conjugated diene and their hydrogenated derivatives, and hydrogenated derivatives of conjugated diene polymers in an amount of 200 parts by weight or less, and

(13) the compositions described in one of the aforementioned items (8) through (12), wherein the composition further comprises organic peroxide in an amount of 0.01 to 0.5 part by weight.

Effects of the Invention

The resin composition of the present invention is easy to handle in cross-linking of rubber or in dynamic cross-linking of a thermoplastic elastomer, attains uniform cross-linking and improves compression set and molding properties of a rubber composition or thermoplastic elastomer composition prepared by the cross-linking.

DESCRIPTION OF THE PREFERRED EMBODIMENTS

The components of the present resin composition, the preparation thereof, and the thermoplastic elastomer composition obtained using the resin composition and the applications will be specifically explained below. The resin composition of the present invention is useful as a master batch of a cross-linking agent for rubber and may preferably be used for cross-linking rubber as well as for dynamically cross-linking thermoplastic elastomer. In the following description, the use in the dynamic cross-linking of thermoplastic elastomer and the resulting thermoplastic elastomer composition will be mentioned. However, the present invention includes the use in the dynamic cross-linking of rubber and the resulting rubber composition, too.

1. Components of the Resin Composition

Component (a):

Component (a) is at least one compound selected from the group consisting of phenol resins and brominated phenol resins. Any phenol resins and brominated phenol resins that can cross-link rubber can be used as Component (a).

Preferably, Component (a) is a phenol resin having the general formula (I):

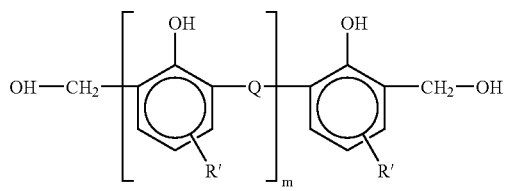

(I)

wherein Q is a divalent group selected from the group consisting of —CH$_2$— and —CH$_2$—O—CH$_2$—, m is 0 or a positive integer of from 1 to 20, and R' is an organic group, and a brominated phenol resin in which the hydroxyl group (preferably terminal hydroxyl group) is substituted with a bromine atom. Preferably, Q is a divalent —CH$_2$—O—CH$_2$— and m is 0 or a positive integer of 1 to 10, and R' is an organic group having less than 20 carbon atoms. More preferably, m is 0 or a positive integer of 1 to 5, and R' is an organic group having 4 to 12 carbon atoms.

Among the aforementioned phenol resins, alkylphenol formaldehyde resins, methylolated alkylphenol resins, brominated alkylphenol resins are more preferred, and in particular, alkylphenol formaldehyde resins are most preferred.

The aforementioned phenol resins can be manufactured in any conventional methods. For instance, an alkyl-substituted phenol or unsubstituted phenol is condensed with aldehyde, preferably formaldehyde in an alkali medium, or bifunctional phenol dialcohol is condensed. Alternatively, commercial phenol resins can be used.

Examples of commercial products for the aforementioned phenol resin are Tackirol 201 (alkylphenol formaldehyde resin, ex Taoka Chemical Co., Ltd.), Tackirol 250-I (brominated alkylphenol formaldehyde resin with a bromination ratio of 4%, ex Taoka Chemical Co., Ltd.), Tackirol 250-III (brominated alkylphenol formaldehyde resin, ex Taoka Chemical Co., Ltd.), PR-4507 (ex Gun Ei Chemical Industry Co., Ltd.), Vulkaresat 510E (ex Hoechst Corp.), Vulkaresat 532E (ex Hoechst Corp.), Vulkaresen E (ex Hoechst Corp.), Vulkaresen 105E (ex Hoechst Corp.), Vulkaresen 130E (Hoechst Corp.), Vulkaresol 315E (Hoechst Corp.), Amberol ST 137X (ex Rohm & Haas Co., Ltd.), Sumilite Resin PR-22193 (ex Sumitomo Dules Co., Ltd.), Symphorm-C-100 (ex Anchor Chem. Co., Ltd.), Symphorm-C-1001 (ex Anchor Chem., Co., Ltd.), Tamanor 531 (ex Arakawa Chemical Co., Ltd.), Schenectady SP1059 (ex Schenectady Chem. Corp.), Schenectady SP1045 (ex Schenectady Chem. Corp.), CRR-0803 (ex U.C.C. Corp.), Schenectady SP1055 (ex Schenectady Chem. Corp.), Schenectady SP1056 (ex Schenectady Chem. Corp.), CRM-0803 (ex Showa Union Synthesis Co., Ltd.), and Vulkadur A (ex Bayer Corp.). In particular, Tackirol 201 (alkylphenol formaldehyde resin) is most preferred.

Component (b):

Component (b) is a crystalline olefin resin. This does not react with the cross-linking agent, component (a). Accordingly, when dynamic cross-linking of thermoplastic elastomer is carried out using the present resin composition as a master batch of the phenol resin type cross-linking agent, cross-linking does not occur in the master batch before dispersion of the master batch. Then, more uniform cross-linking can be implemented, compared to a case of a phenol resin master batch containing butyl rubber.

Examples of component (b) are homopolymers of olefins such as ethylene, propylene, butene-1, and 4-methylpentene-1, and copolymers consisting primarily of these olefins. However, a copolymer of ethylene with unsaturated carboxylic acid ester or vinyl acetate have problems that it shows high tackiness upon melting and strong adhesion to a metal (blender) due to its polarity, tends to yellow and has bad odor, so that productivity of the resin composition is poor. Even if a product can be produced, blocking occurs, which is undesirable. Further, if the resin composition obtained is used in dynamic cross-linking of a thermoplastic elastomer, the resulting thermoplastic elastomer composition shows bad compression set and hard spots occur easily in a molded product, which is undesirable. Therefore, component (b), crystalline olefin resin, is not a copolymer of ethylene with unsaturated carboxylic acid ester or vinyl acetate.

Particularly preferred are homopolymers of ethylene or propylene, and crystalline copolymers consisting primarily of ethylene or propylene. More specifically, crystalline ethylene polymers such as high density polyethylene, low density polyethylene, and ethylene/α-olefin copolymers, propylene homopolymers and crystalline propylene copolymers such as propylene-α-olefin copolymers may be named. Here, examples of α-olefins that are used in the copolymers of ethylene or propylene include α-olefins with 2 to 10 carbon atoms such as ethylene, propylene, butene-1, hexene-1,4- methylpentene-1,3-methylpentene-1, octene-1 and the like. The crystalline copolymers consisting primarily of ethylene or propylene include crystalline ethylene polymers such as ethylene-butene-1 copolymers, ethylene-hexene-1 copolymers, and ethylene-octene-1 copolymers, and crystalline propylene polymers such as propylene-ethylene random copolymers, propylene-ethylene block copolymers, propylene-ethylene random block copolymers, propylene-butene-1 copolymers, propylene-ethylene-butene-1 terpolymers.

A catalyst that may be used in synthesizing component (b) includes Ziegler-Natta catalysts and metallocene catalysts.

From the aspect of compatibility with rubber, ethylene resins synthesized using a metallocene catalyst are preferable as component (b). In a case where the resin composition of the present invention is used for cross-linking a thermoplastic elastomer composition where rubber is dispersed in a polypropylene (PP) matrix, propylene is also preferable as component (b) because cross-linking can be carried out while keeping such a structure that the rubber is dispersed completely in the PP matrix.

The melting point of component (b), as determined by DSC, is preferably from 30 to 180° C., more preferably from 40 to 170° C. Here, the melting point by DSC is a peak top melting point presented by a differential scanning colorimeter (DSC). Specifically, a sample of 10 mg is taken up, kept at a temperature of 190° C. for 5 min., crystallized by lowering the temperature to −10° C. at a descending temperature rate of 10° C. per min., kept the temperature at −10° C. for 5 min., and then heated up to 200° C. at a rate of 10° C. per min.

The amount of component (b) to be added is from 20 to 500 parts by weight, preferably from 80 to 350 parts by weight, per 100 parts by weight of component (a). If it exceeds 500 parts by weight, the compression set of the thermoplastic elastomer composition obtained is too low. If it is less than 20 parts by weight, oil-bleeding resistance, anti-blocking property and productivity are worse.

Component (c):

Component (c) is a non-aromatic softening agent for rubber, and is used as an optional component. Preferably, paraffin oils are used. For instance, paraffin compounds having 4 to 155 carbon atoms, preferably paraffin compounds having 4 to 50 carbon atoms, are used. More specifically, the following paraffin compounds can be used: n-paraffins (linear saturated hydrocarbons) such as butane, pentane, hexane, heptane, octane, nonane, decane, undecane, dodecane, tetradecane, pentadecane, hexadecane, heptadecane, ocadecane, nonadecane, eicosane, heneicosane, docosane, tricosane, tetracosane, pentacosane, hexacosane, heptacosane, octacosane, nonacosane, triacontane, hentriacontane, dotriacontane, pentatriacontane, hexacontane, and heptacontane; isoparaffins (branched saturated hydrocarbons) such as isobutene, isopentane, neopentane, isohexane, isopentane, neohexane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethylpentane, 2,2,3-trimethylbutane, 3-methylheptane, 2,2-dimethylhexane, 2,3-dimethylhexane, 2,4-dimethylhexane, 2,5-dimethylhexane, 3,4-dimethylhexane, 2,2,3-trimethylpentane, isooctane, 2,3,4-trimethylpentane, isononane, 2-methylnonane, isodecane, isoundecane, isododecane, isotridecane, isotetradecane, isopentadecane, isooctadecane, isonanodecane, isoeicosane, and 4-ethyl-5-methyloctane; and derivatives of these saturated hydrocarbons. These paraffin oils are preferably in a liquid form at room temperature. A mixture of two or more of these can be used.

Commercially available paraffin oils that are in a liquid form at room temperature include NA Solvent (isoparaffin hydrocarbons), ex Nippon Oils and Fats Corporation, PW-90 and PW-380 (n-paraffin type process oils), ex Idemitsu Kosan Co., Ltd., IP-Solvent 2835 (synthetic isoparaffin hydrocarbon, isoparaffin content of 99.8% or higher)), ex Idemitsu Petrochemical Co., Ltd., Neothiozol (n-paraffin process oils), ex Sanko Chemical Co., Ltd.

The paraffin oils may contain a small quantity of unsaturated hydrocarbons and their derivatives. Examples of the unsaturated hydrocarbons are ethylenic hydrocarbons such as ethylene, propylene, 1-butene, 2-butene, isobutylene, 1-pentene, 3-methyl-1-butene, 3-methyl-1-butene, 2-methyl-2-butene, 1-hexene, 2,3-dimethyl-2-butene, 1-heptene, 1-octene, 1-nonene and 1-decene; and acetylenic hydrocarbons such as acetylene, methylacetylene, 1-butyn, 1-pentyn, 1-hexyn, 1-octyn, 1-nonyn and 1-decyn.

Component (c) preferably has a dynamic viscosity at 37.8° C. of from 20 to 500 cSt; a flow point of from −10 to −15° C.; and a flashpoint of from 170 to 300° C.

The amount of component (c) to be added ranges from 0 to 300 parts by weight per 100 parts by weight of component (a). If it exceeds 300 parts by weight, oil-bleeding becomes prominent. If the amount of component (c) added is relatively higher in the aforementioned range, that is, if the amount of component (c) ranges from 50 to 300 parts by weight, preferably 80 to 200 parts by weight, per 100 parts by weight of component (a), blending of components (a) and (b) is easier and the productivity of the resin composition is much better. Meanwhile, if the amount of component (c) is relatively lower in the aforementioned range, that is, if the amount of component (c) is less than 50 parts by weight, preferably from 10 to 40 parts by weight, per 100 parts by weight of component (a), tackiness of the resin composition is reduced and pellets from the resin composition have a better anti-blocking property, and a thermoplastic elastomer composition is obtained which has much less hard spots.

Component (d):

Component (d) is a cross-linking promoter and is used as an optional component for further improving the function of component (a) as a cross-linking agent. Examples of component (d) include zinc oxide, magnesium oxide and stannic dichloride. When zinc oxide is used as component (d), stearic acid metal salts and the like can be used together as a dispersant. Among the aforementioned cross-linking promoters, zinc oxide is most preferred.

The amount of component (d) to be added is 200 parts by weight or less, preferably from 0.3 to 200 parts by weight, more preferably from 0.3 to 150 parts by weight and most preferably from 0.5 to 80 parts by weight, per 100 parts by weight of component (a). If the amount of component (d) exceeds the aforementioned upper limit, compatibility of the resin composition with the rubber and the other components is worse in the production of a thermoplastic elastomer composition, resulting in less improved compression set and moldability of the thermoplastic elastomer composition.

2. Production of the Resin Composition

The resin composition of the present invention may be prepared by melt kneading the aforesaid components (a) and (b) and, optionally, (c) and (d) all at once or in any order. Any method may be used for the kneading, such as conventional ones. For instance, a single screw extruder, a twin-screw extruder, rolls, Banbury mixer, or pressure kneader may be used to carry out the operation continuously. A temperature in the melt kneading is preferably 70 to 170 C.

The resin composition of the present invention can be easily pelletized and used as a master batch of a cross-linking agent in dynamic cross-linking of a thermoplastic elastomer. The resin composition of the present invention is easy to handle in the production of a thermoplastic elastomer composition, and also gives uniform cross-linking, that is, no hard spots occur in a molded product of the thermoplastic elastomer compositions. Further, the compression set and the moldability of the thermoplastic elastomer composition obtained is improved.

3. Thermoplastic Elastomer Composition

The thermoplastic elastomer composition of the present invention can be prepared by adding the aforementioned resin composition to rubber to which other components, if desired, have been added, and melt kneading them. The amount of the resin composition ranges from 1 to 280 parts by weight, preferably from 4 to 200 parts by weight, more preferably from 10 to 100 parts by weight, per 100 parts by weight of the rubber. If the amount of the resin composition exceeds the upper limit, whitening in bending and fatigue in flexion of the thermoplastic elastomer composition obtained are worse. A method of melt kneading may be the same as the method mentioned above for the production of the resin composition.

The rubber may be ethylenic copolymer rubber (such as EPDM), butadiene rubber (BR), butyl rubber (IIR) and nitrile rubber (NBR). In particular, ethylenic copolymer rubber (such as EPDM) is most preferred.

The aforementioned ethylenic copolymer rubber may be, for instance, copolymers of ethylene with α-olefin such as propylene, 1-butene, and 1-pentene, and copolymers thereof with non-conjugated polyene.

The aforementioned non-conjugated polyenenes may be non-conjugated dienes such as, for instance, 5-ethylidene-2-norbornene (ENB), 1,4-hexadiene, 5-methylene-2-norbornene (MNB), 1,6-octadiene, 5-methyl-1,4-hexadiene, 3,7-dimethyl-1,6-octadiene, 1,3-cyclopentadiene, 1,4-cyclohexadiene, tetrahydroindene, methyltetrahydroindene, dicyclopentadiene, 5-isopropylidene-2-norbornene, 5-vinyl-norbornene, 5-vinyl-norbornene, dicyclooctadiene, and methylenenorbornene.

Specific examples of the ethylenic copolymer rubber include ethylene-propylene copolymer rubber, ethylene-propylene non-conjugated diene copolymer rubber, ethylene-1-butene copolymer rubber, ethylene-1-butene non-conjugated diene copolymer rubber, and ethylene-propylene-1-butene copolymer rubber. From the aspect of the cross-linking ability of the phenol resin, ethylene-propylene-non-conjugated diene copolymer rubber (EPDM) is most preferred.

The catalyst to be used in the synthesis of ethylenic copolymer rubber may be Ziegler-Natta catalyst or metallocene catalyst. The ethylenic copolymer rubber prepared with the metallocene catalyst system has uniform distribution of the components (because the content of the non-conjugated polyene is uniform in a case where a non-conjugated polyene compound is contained) so that uniform cross-linking is advantageously attained.

The range of the ethylene content in the ethylenic copolymer rubber is preferably 40 to 80% by weight, more preferably 50 to 75% by weight. In particular in the range of from 60 to 75% by weight, the productivity, compression set at high temperatures and tensile strength of the thermoplastic elastomer composition are well balanced, which is desirable. A preferred content of the non-conjugated polyene ranges from 0.5 to 8 percent by weight, more preferably from 4 to 8 percent by weight. The ethylenic copolymer rubber preferably has a Mooney viscosity $ML_{1+4}$ (125° C.) ranging from 10 to 180, more preferably from 20 to 160. If the Mooney viscosity $ML_{1+4}$ (125° C.) is less than 10, the compression set of the thermoplastic elastomer composition obtained is too low. If it exceeds 180, molding properties are worse.

The thermoplastic elastomer composition of the present invention may comprise a crystalline olefin resin, if desired. The crystalline olefin resin is used for the purpose of adjusting hardness of the thermoplastic elastomer composition, improving molding properties and implementing heat resistance. Specific examples of the aforementioned crystalline olefin resins include the following: homopolymers of olefins such as ethylene, propylene, and butene-1,4-methylpentene-1, or copolymers consisting primarily of these olefins. Among them, homopolymers of ethylene or propylene, or crystalline copolymers consisting primarily of ethylene or propylene are preferred. Specifically, crystalline ethylene polymers such as high density polyethylene, low density polyethylene, and ethylene-α-olefin copolymers, propylene homopolymers, and crystalline propylene copolymers such as propylene-α-olefin copolymers are preferred. Here, α-olefins that are used in the copolymers of ethylene or propylene are α-olefins having 2 to 10 carbon atoms, for instance, ethylene, propylene, butene-1, hexene-1,4-methylpentene-1,3-methylpentene-1, and octene-1 are preferred. The crystalline copolymer consisting primarily of ethylene or propylene includes crystalline ethylenic copolymers such as ethylene-butene-1 copolymer, ethylene-hexene-1 copolymer, and ethylene-octene-1 copolymer; crystalline propylene polymers such as propylene-ethylene random copolymer, propylene ethylene block copolymer, propylene-ethylene random block copolymer, propylene-butene-1 copolymer, and propylene-ethylene-butene-1 terpolymer are preferred.

The amount of the crystalline olefin resin is 400 parts by weight or less, preferably 300 parts by weight or less, more preferably 250 parts by weight or less, and most preferably 150 parts by weight or less, per 100 parts by weight of the rubber. The aforementioned amount is preferably at least 5 parts by weight, more preferably at least 20 parts by weight, and most preferably at least 30 parts by weight, per 100 parts by weight of the rubber. If it exceeds 400 parts by weight, compression set and softness of the thermoplastic elastomer composition obtained is worse.

The thermoplastic elastomer composition of the present invention may contain, if desirable, a cross-linking promoter. Specific examples of the cross-linking promoters are the same as those mentioned as component (d) for the aforementioned resin composition. Zinc oxide is most preferred.

The amount of the cross-linking promoter is 200 parts by weight or less per 100 parts by weight of component (a). However, if the resin composition contains component (e), the total with component (e) is 200 parts by weight or less per 100 parts by weight of component (a). That is, the total amount of the cross-linking agent contained in the thermoplastic elastomer composition is set to be 100 parts by weight or less per 100 parts by weight of component (a). More preferably, the total amount ranges from 0.3 to 200 parts by weight, more preferably from 0.3 to 150 parts by weight, and most preferably from 0.5 to 80 parts by weight, per 100 parts by weight of component (a). If the amount of the cross-linking agent is too large, the flowability of the thermoplastic elastomer composition is so worse as to make the production and molding difficult; whitening in bending, anti-fatigue in flexion, and oil-bleeding resistance are worse; and, further, compression set is worse.

The cross-linking promoter is preferably included in the resin composition as component (d) to reduce hard spots in a molded product. However, it can be added during the production of a thermoplastic elastomer composition instead of being included in the resin composition. Also, a portion of the cross-linking promoter can be added as component (d) in the resin composition, and the remaining portion can be added during the production of a thermoplastic elastomer composition.

Furthermore, the thermoplastic elastomer composition of the present invention may contain a non-aromatic softening agent for rubber, if desirable. The non-aromatic softening agent for rubber is used for the purpose of imparting softness to the thermoplastic elastomer composition and also for improving moldability. Specific examples of the non-aromatic softening agent for rubber are the same as those described as component (c) for the aforementioned resin composition. The amount of the non-aromatic softening agent for rubber is 800 parts by weight or less, preferably 600 parts by weight or less, more preferably 500 parts by weight, most preferably 300 parts by weight or less, further more preferably 200 parts by weight of less, and particularly 150 parts by weight or less, per 100 parts by weight of the rubber. The aforementioned amount is preferably at least 10 parts by weight and more preferably at least 20 parts by weight per 100 parts by weight of the rubber. If the amount exceeds the upper limit, bleeding tens to occur on the surface of a molded product made of the thermoplastic elastomer composition obtained.

Moreover, the thermoplastic elastomer composition of the present invention may, if desirable, contain at least one polymer selected from the group consisting of copolymers of an aromatic vinyl compound and conjugated diene (P-1) and their hydrogenated derivatives (P-2), and hydrogenated derivatives of conjugated diene polymers (P-3). The aforementioned polymer is used in order to retain paraffin oil and to adjust softness of the thermoplastic elastomer composition obtained.

The copolymers (P-1) include random copolymers of aromatic vinyl compound and conjugated diene (P-1-1) and block copolymers of aromatic vinyl compounds and conjugated diene (P-1-2). The aromatic vinyl compound constituting these copolymers may be one or more selected from styrene, t-butylstyrene, α-methylstyrene, p-methylstyrene, divinylbenzene, 1,1-diphenylstyrene, N,N-diethyl-p-aminoethylstyrene, vinyl toluene, and p-tert-butylstyrene. In particular, styrene is preferred. The conjugated diene may be, for instance, one or more selected from butadiene, isoprene, 1,3-pentadiene, 2,3-dimethyl-1, and 3-butadiene In particular, butadiene, isoprene, and a combination of these are preferred.

The aforementioned random copolymer (P-1-1) comprises an aromatic vinyl compound in an amount of 3 to 60 percent by weight, preferably 5 to 50 percent by weight. The number average molecular weight ranges preferably from 150,000 to 500,000, more preferably from 170,000 to 400,000, and most preferably from 200,000 to 350,000. The molecular weight distribution is 10 or less.

Specific examples of the aforementioned random copolymer (P-1-1) are copolymers of styrene and butadiene (SBR).

The aforementioned block copolymer (P-1-2) comprises at least two polymer blocks A consisting primarily of an aromatic vinyl compound and at least one of polymer block B consisting primarily of a conjugated diene, such as, for instance, aromatic vinyl compound-conjugated diene block copolymers have the structures: A-B-A, B-A-B-A, or A-B-A-B-A. The aforementioned block copolymer comprises an aromatic vinyl compound in an amount of 5 to 60 percent by weight, preferably 20 to 50 percent by weight.

Preferably, the polymer block A consisting primarily of an aromatic vinyl compound is composed solely of an aromatic vinyl compound, or is a copolymer bock comprising at least 50 percent by weight, preferably at least 70 percent by weight of an aromatic vinyl compound with a conjugated diene.

The polymer block B consisting primarily of conjugated diene preferably comprises a conjugated diene alone, or is a copolymer bock comprising at least 50 percent by weight, preferably at least 70 percent by weight, of a conjugated diene with an aromatic vinyl compound.

The number average molecular weight of the aforementioned block copolymers (P-1-2) preferably ranges from 5,000 to 1,500,000, more preferably from 10,000 to 550,000, and further more preferably from 100,000 to 400,000. The molecular weight distribution is 10 or less. The molecular structure of the block copolymer may be linear, branched or helical or any combinations of these.

In the polymer block A consisting primarily of an aromatic vinyl compound and in the polymer block B consisting primarily of the conjugated diene, the distribution manner of the units derived from the conjugated diene or aromatic vinyl compound in the molecular chain can be random, tapered (that is, the amount of the monomer component increases or decreases along the molecular chain), partially blocked or any combinations of these. If two or more polymer blocks A consisting primarily of an aromatic vinyl compound are present or if two or more polymer blocks B consisting primarily of conjugated diene are present, the polymer blocks may have the same structure or different structures.

Specific examples of the aforementioned block copolymer (P-1-2) include styrene-butadiene-styrene copolymers (SBS), and styrene-isoprene-styrene copolymers (SIS).

Many methods have been proposed as to produce the aforementioned block copolymers (P-1-2). According to the typical method as disclosed in Japanese Patent Publication No. Sho-40-23798/1965, block polymerization is carried out in an inert solvent, using a lithium catalyst or a Ziegler catalyst.

The aforementioned hydrogenated derivative (P-2) includes hydrogenated derivatives (P-2-1) of the aforementioned random copolymers (P-1-1) and hydrogenated derivatives (P-2-2) of the aforementioned block copolymers (P-1-2).

The hydrogenated derivative (P-2-1) is hydrogenated random copolymers obtained by hydrogenating the aforementioned random copolymers (P-1-1).

The hydrogenated derivative (P-2-1) preferably has a melt mass flow rate of 12 g/10 min. or less, more preferably 6 g/10 min. or less, as determined according to ASTM D 1238 at 230° C. with a load of 21.18N, from the aspect of tensile properties and heat deformation resistance.

The content of the aromatic vinyl compound in the hydrogenated derivatives (P-2-1) is preferably 25 percent by weight or less, more preferably 20 percent by weight or less, for the purpose of obtaining a soft thermoplastic elastomer compound. For the same purpose, preferably at least 90%, more preferably 100%, of the carbon-carbon double bonds of the conjugated diene are hydrogenated.

As the hydrogenated derivative (P-2-1), Dinalon 1320P (JSR Corporation) may be mentioned, for instance.

The hydrogenated derivative (P-2-2) is a hydrogenated block copolymer obtained by hydrogenating the aforementioned block copolymer (P-1-2).

The degree of hydrogenation in the hydrogenated derivative (P-2-2) can be arbitrary. Preferably, the degree of hydrogenation is 50% or greater, more preferably 55% or greater, further preferably 60% or greater in the polymer block B consisting primarily of a conjugated diene. Its microstructure is arbitrary. For instance, in a case where the block B is constituted of butadiene alone, the ratio of the 1,2-microstructure in the polybutadiene block preferably ranges from 20 to 50 percent by weight, more preferably from 25 to 45 percent by weight. The 1,2-bonds may be selectively hydrogenated. In a case where the block B is constituted of a mixture of isoprene and butadiene, the ratio of the 1,2-microstructure is preferably less than 50%, more preferably less than 25% and most preferably less than 15%.

Preferably, if the block B is constituted of isoprene only, 70 to 100 percent by weight of the isoprene in the polyisoprene block has the 1,4-microstructure and at least 90% of the aliphatic double bonds derived from isoprene is hydrogenated.

It is preferred that, the polymer block A accounts for 5 to 70% by weight of the entire components in the hydrogenate (P-2-2). The whole weight average molecular weight of the hydrogenated derivative (P-2-2) is preferably 150,000 to 500,000, more preferably 200,000 to 400,000. If the weight average molecular weight is less than 200,000, oil bleeding occurs.

Specific examples of the hydrogenated derivative (P-2-2) include styrene-ethylene-butene copolymers (SEB), styrene-ethylene-propylene copolymers (SEP), styrene-ethylene-butene-styrene copolymers (SEBS), styrene-ethylene-propylene-styrene copolymers (SEPS), styrene-ethylene-ethylene-propylene-styrene copolymers (SEEPS), and styrene-butadiene-butylene-styrene copolymers (partially hydrogenated styrene-butadiene-styrene copolymers, SBBS).

Among them, styrene-ethylene-ethylene-propylene-styrene copolymers (SEEPS) are most preferred from the aspect of an excellent effect of imparting softness and reduced oil bleeding.

The hydrogenated derivative (P-2-2) can be produced by applying an hydrogenation treatment for the aforementioned block copolymer (P-1-2). The hydrogenation treatment can be carried out by a known method, For instance, in the presence of a hydrogenation catalyst in an inert solvent.

The hydrogenated derivative (P-3) is a hydrogenated derivative of a conjugated diene polymer. For instance, this may be a block copolymer having a crystalline ethylene block and an amorphous ethylene block (CEBC) obtained by hydrogenating the butadiene polymer. Hydrogenated derivative (P-3) can be used alone or as a mixture of two or more of such.

The weight average molecular weight of the hydrogenated derivative (P-3) is preferably 500,000 or less, more preferably from 200,000 to 450,000. If the weight average molecular weight exceeds 500,000, extrusion and injection molding properties of a resultant thermoplastic elastomer composition are worse. In contrast, if it is less than 200,000, oil bleeding occurs and the compression set of a resultant thermoplastic elastomer composition is worse.

Among the aforementioned polymers, the hydrogenated derivative (P-2-2), in particular, styrene-ethylene-ethylene-propylene-styrene copolymers (SEEPS), is preferred from the aspect of an excellent effect of imparting softness and minimum oil bleeding. In particular, Septon 4077 and 4055 (ex Kurare Corp.) are most preferred because of its molecular weight.

The amount of the aforementioned polymer is 200 parts by weight or less, preferably 160 parts by weight or less, more preferably 120 parts by weight or less, most preferably 80 parts by weight or less, and particularly 60 parts by weight or less, per 100 parts by weight of the rubber. Also, the aforementioned amount is at least 3 parts by weight, preferably at least 5 parts by weight, per 100 parts by weight of the rubber. If the amount exceeds the aforesaid upper limit, the compression set of the thermoplastic elastomer composition obtained is worse.

Furthermore, the thermoplastic elastomer composition of the present invention may contain organic peroxide, if desired. The organic oxide is used for the purpose of further improving the compression set of the thermoplastic elastomer composition obtained.

Examples of organic peroxide include 1,1-bis(t-hexylperoxy)-3,3,5-trimethylcyclohexane, 1,1-bis(t-butylperoxy)-3,3,5-trimethylcyclohexane, benzoyl peroxide, m-methylbenzoyl peroxide, m-toluoyl peroxide, t-hexyl peroxibenzoate, 1,1-bis(t-butylperoxy) 2-methylcyclohexane, 1,1-bis(t-hexylperoxy)cyclohexane, 1,1-bis(t-butylperoxy) cyclohexane, 2,2-bis(4,4-dibutylperoxy cyclohexyl) propane, 1,1-bis(t-butylperoxy) cyclododecane, t-hexylperoxy isopropylmonocarbonate, succinic acid peroxide, 1-cyclohexyl-1-methylethylperoxy-2-ethylhexanoate, t-hexylperoxy-2-ehylhexanoate, t-butylperoxy-2-ethylhexanoate, m-toluoyl and benzoyl peroxide, t-butylperoxy isobutylate, t-butylperoxy laurate, 2,5-dimethyl-2,5-di(m-toluoylperoxy) hexane, t-butylperoxy isopropylmonocarbonate, t-butylperoxy-2-ethylhexylmonocarbonate, 2,5-dimethyl-2,5-di(benxoylperoxy) hexane, t-butylperoxy acetate, 2,2-bis (t-butylperoxy) butane, dicumylperoxide, di-tert-butylperoxide, 2,5-dimethyl-2,5-di-butylperoxy) hexyne-3,1,3-bis (tert-butylperoxy isopropyl) benzene, 1,1-bis (tert-butylperoxy)-3,3,5-trimethylcyclohexane, n-butyl-4,4-bis (tert-butylperoxy) valerate, benzoyl peroxide, p-chlorobenzoylperoxide, 2,4-dichlorobenzoylperoxide, tert-butylperoxybenzoate, tert-butylperoxy isopropylcarboante, diacetyl peroxide, lauroyl peroxide, and tert. butylcumylperoxide.

Among them, 1,1-bis(t-hexylperoxy)-3,3,5-trimethylcyclohexane (one minute half-life temperature: 147° C.), 2,5-dimethyl-2,5-di(tert.butylperoxy) hexane (one minute half-life temperature: 179° C.) and 2,5-dimethyl-2,5-di (tert.butylperoxy) hexyn-3 (one minute half-life temperature: 194° C.) are preferred from the aspect of odor, coloring and scorching stability.

If the organic peroxide is added to the thermoplastic elastomer composition, its amount ranges from 0.01 to 0.5 parts by weight, preferably from 0.05 to 0.3 parts by weight, per 100 parts by weight of the rubber. If the amount exceeds 0.5 parts by weight, a decomposition reaction due to the organic peroxide proceeds so that the compression set of the thermoplastic elastomer composition obtained is worse.

The thermoplastic elastomer composition of the present invention may contain the following additives as long as the purposes of the present invention are interfered with: heat stabilizers, antioxidants, photo stabilizers, UV-ray absorbents, crystal nucleation agents, anti-blocking agents, sealing improving agents, stearic acid, mold-releasing agents such as silicone oil, lubricants such as polyethylene waxes, coloring agents, pigments, inorganic fillers (alumina, talc, calcium carbonate, mica, wollastonite, clay), foaming agents (organic and inorganic), and flame retardants (metal hydrates, red phosphorus, ammonium polyphosphate, antimony, silicone).

As the antioxidants, phenolic antioxidants such as 2,6-di-tert-p-butyl-p-cresol, 2,6-di-tert-butyl phenol, 2,4-dimethyl-6-tert-butylphenol, 4,4-dihydroxydiphenyl, tris (2-methyl-4-hydroxy-5-tert-butylphenyl) butane, phosphite antioxidants, and thioether antioxidants are named for instance. Among them, phenolic antioxidants and phosphite antioxidants are particularly preferred.

As the foaming agents, Expancell (ex Expancell Corp.) and Matsumoto Microsphere (ex Matsumoto Yushi-Seiiyaku Co., Ltd.) are preferred.

4. Usages

The thermoplastic elastomer composition of the present invention exhibits excellent compression set in a high temperature region and has excellent extrusion molding and injection molding properties, so that it can be used in the following usages where the composition is molded by blow molding, extrusion molding, injection molding, hot molding, elasto-welding, and compression molding methods and the like.

Specific examples to the usages include, for instance, automobile parts: lighting gaskets, 3D exchange blow clean air ducts, flow seal hinge cover belly pans (robotic extrusion gaskets), cup holders, side break grips, shift knob covers, seat adjustment knobs, IP skins, flapper door seals, wire harness grommets, rack and pinion boots, suspension cover boots (strut cover boots), glass guides, inner beltline seals, roof guides, trunk grid seals, molded quarter window gaskets, corner moldings, glass encapsulation (robotic extrusion), hood seals, glass encapsulation (injection molding), glass run channels, secondary seals, and the like. The applications for industrial parts include curtain wall gaskets for tall buildings, window frame seals, adhesion to metals and reinforcement fibers, parking deck seals, expansion joints, earthquake-proof expansion joints, residential window door seals (co-extrusion, etc.), residential door seals, railing surface cover, walking mats (sheets), leg rubber, washing machine drain hoses (double molding with PP, etc.), washing machine cover seals, air conditioner motor mounts, drainage pipe seals (double molding with PP, etc.), riser tubes, (PVC, etc.) pipe joint packing, caster wheels, printer rolls, duct hoses, wires and cables, injection syringes and gaskets, and the like. Furthermore, it may be used also in the following applications: daily items and parts such as speaker surroundings, hair brush grips, shaver grips, cosmetic grips and foots, toothbrush grips, daily brush grips, broom tips, kitchen item grips, measuring spoon grips, branch chopping scissors, glass heat resistant container lids, gardening item grips, scissor grips, stapler grips, computer mouse, golf bag parts, wall painting spatula grips, chainsaw grips, screw driver grips, hammer grips, electric drill grips, polishing machine grips, alarm clocks, and the like.

Further specific usages include, for instance, vehicle parts such as weather seals, brake parts such as cups, coupling disks, and diaphragms as in steady speed joints and rack transmission joints, boots, tubes and sealing gaskets in the parts of oil-pressure or pneumatic pressure operated devices, O-rings, pistons, valves, valve washers, valve guides, and other elastic polymer parts, or elastic polymers combined with other materials such as metals/plastics combined materials, V-belts, gear belts with truncated ribs containing fabric faced Vs, conveyor belts containing molded rubber having polished short fiber reinforcement Vs and short fiber flock processed Vs.

The present invention will be explained below in more detail with reference to the Examples and the Comparative Examples. However, the present invention shall not be limited by the Examples. The test methods and the raw materials used in the Examples and the Comparative Examples are as follows.

1. Test Methods (1) Specific Gravity: In accordance with JIS (Japanese Industrial Standards) K 7112, a 1 mm-thick press sheet was used as a specimen for the measurement.

(2) Hardness: In accordance with JIS K 7215, a 6.3 mm-thick press sheet was used as a specimen and the measurement was conducted with a durometer with hardness: type A.

(3) Anti-blocking: Two sheets (130×160×2 mm) prepared by hot press at 130° C., preheating for 2 min./pressing for 2 min., a pressure of 50 kg/cm$^2$, were put one on top of another and a disk-shaped weight of 500 g (diameter: 70 mm) was placed on the top. After leaving the sheets at room temperature (23° C.) for one hour, the peeling of the two sheets was evaluated based on the following criteria. When polypropylene was used as component (b) (Example 3), the press temperature was set at 180° C.

E: Two sheets were peeled off from each other without applying any force (not adhered)

G: Two sheets were adhered, but they could be easily peeled off from each other.

B: Two sheets were adhered and a considerable force was needed to peel them off from each other.

(4) Oil-bleeding resistance: A sheet (130×160×2 mm) prepared by hot press at 130° C., preheating for 2 min./pressing for 2 min., a pressure of 50 kg/cm$^2$, was inserted between two sheets of craft paper and a disk-shaped weight of 500 g (diameter: 70 mm) was placed on the top. After leaving the sheets at room temperature (23° C.) for 168 hours, the craft paper was observed visually and evaluated based on the following criteria. When polypropylene was used as component (b) (Example 3), the press temperature was set at 180° C.

G: No trace of oil bleeding was found on the craft paper.

B: Trace of oil bleeding was clearly seen on the craft paper.

(5) Productivity-1: A resin composition was prepared with a 3 L pressure kneader type mixer (setup temperature: 90° C., blending for 10 min.) and evaluated based on the following criteria.

G: The resin composition was completely peeled off from the production machine and discharged.

B: The resin composition adhered to the production machine and could not be discharged.

(6) Productivity-2: A resin composition was prepared with a twin-screw extruder (L/D=47, blending temperature: 170° C., screw rotation: 300 r.p.m.) and evaluated based on the following criteria.

E: The load was not large, so that the extrusion throughput could be increased up to the maximum of the conveying capacity of the extruder.

G: A certain degree of load was needed, but the production was possible with a practical extrusion throughput.

B: The load was too large, so that production was impossible.

(7) Productivity-3: A resin composition was prepared with a twin-screw extruder (L/D=47, blending temperature: 170° C., screw rotation: 300 r.p.m.) and evaluated based on the following criteria.

E: The strands extruded from the die could be taken up at a satisfactory speed while being cooled in a water bath.

G: When the strands extruded from the die were taken up at a high speed, the strands broke easily, but the production was possible if cooling and take-up conditions were adjusted appropriately.

B: The strands extruded from the die were very brittle, so that the strands could not be taken up at all even when the conditions were changed.

(8) Compression set: The compression set of the thermoplastic elastomer composition was measured in accordance with JIS K 6262, under a condition of 25% deformation, at 120° C. for 22 hours. A 6.3 mm-thick press sheet was used as a specimen.

(9) Uniformity of the cross-linking (number of hard spots): A thermoplastic elastomer composition was extruded into a 50 mm×1 mm sheet. The number of hard spots present on the surface of an area of 50 mm×100 mm was counted. If the number of hard spots was less than 10, the uniformity was evaluated as good. The number of hard spots lower, the cross-linking in the thermoplastic elastomer composition more uniform.

2. Raw Materials Used
Resin Compositions
Component (a): Tackirol 201 (ex Taoka Chemical Co., Ltd.), alkylphenol formaldehyde resin
Component (b):
(1) ENGAGE 8180 (ex DuPont Dow Elastomers LLC), polyethylene polymerized using a metallocene catalyst, density: 0.863 g/cm$^3$, Mooney viscosity (ML$_{1+4}$, 121° C.): 35, MFR: 0.5 g/10 min. (ASTM D 1238, 190° C., 2.16 Kg load), hardness Shore A: 66, Tm: 49° C., comonomer: octene-1
(2) Novatec BC08AHA (ex Japan Polychem Corporation), Propylene-ethylene block copolymer, density: 0.902 g/cm$^3$, hardness: 94 (Shore A), MFR (230° C., 21.18; N load): 80 dg/min. weight average molecular weight: 100,000
Comparative Component (b):
(1) EV150 (ex Mitsui DuPont Polychemical Co., Ltd.), ethylene-vinyl acetate copolymer (EVA), MFR 30 dg/min. vinyl acetate content: 33 wt %, tensile strength: 9 MPa
(2) WK307 (ex Sumitomo Chemical Co., Ltd.), ethylene-methyl methacrylate copolymer (EMMA), density: 0.94 g/cm$^3$, MFR: 7 g/10 min. (JIS K 6730-1981, 190° C., 2.16 Kg load), hardness Shore A: 90, methyl methacrylate content: 25 wt %
Component (c): PW-90 (ex Idemitsu Kosan Co., Ltd.) n-paraffin oil, weight average molecular weight: 540, dynamic viscosity at 40° C.: 95.54 cSt, dynamic viscosity at 100° C.: 11.25 cSt, flow point: −15° C., flash point (COC): 270° C. Component (d): 2 kinds of zinc oxide (ex Sakai Chemical Industry Co., Ltd.)

Thermoplastic Elastomer Compositions
(1) EPDM: Nordel IP 4770R (ex DuPont Dow Elastomers LLC.), ethylene-propylene-5-ethylidene-2-norbornene (ENB) copolymer rubberpecific gravity: 0.88, Mooney viscosity ML$_{1+4}$ (125° C.): 70, weight average molecular weight: 200,000, ethylene: 70%, ENB: 4.9%
(2) PP: Novatec BC08AHA (ex Japan Polychem Corporation), propylene-ethylene block copolymer, density: 0.902 g/cm$^3$, hardness: 94 (Shore A), MFR (230° C., 21.18N load): 80 dg/min. weight average molecular weight: 100,000
(3) Paraffin oil: PW-380 (ex Idemitsu Kosan Co., Ltd.), n-paraffin oil, weight average molecular weight: 746, dynamic viscosity: 381.6 cSt (40° C.), flashpoint (COC): 300° C.
(4) SEEPS: Septon 4077 (ex Kuraray Corp.), styrene-ethylene-ethylene-propylene-styrene copolymer, number average molecular weight (Mn): 260,000, weight average molecular weight (Mw): 330,000, styrene content: 30%
(5) Organic peroxide: Per-hexa 25B (ex NOF Corporation), 2,5-dimethyl-2,5-di (t-butylperoxy)-hexane
(6) Zinc oxide: two kinds of zinc oxide (ex Sakai Chemical Industry Co., Ltd.)

EXAMPLES

Examples 1 through 5 and Comparative Examples 1 through 5

The components shown in Table 1 in the quantities shown in Table 1 were placed in a 3 L pressure kneader type mixer and melt kneaded at a blending temperature of 170° C. to obtain a resin composition. The mixture was pelletized. The pellets were injection molded or press molded to prepare specimens that were then used in the aforementioned tests (1) through (7). The results are as shown in Table 1.

TABLE 1

| | | Resin Compositions | | | | | | | | | |
|---|---|---|---|---|---|---|---|---|---|---|---|
| | | Ex. 1 | Ex. 2 | Ex. 3 | Ex. 4 | Ex. 5 | Comp. Ex. 1 | Comp. Ex. 2 | Comp. Ex. 3 | Comp. Ex. 4 | Comp. Ex. 5 |
| Component | (a) Tackirol 201 | 100 | 100 | 100 | 100 | 100 | 100 | 100 | 100 | 100 | 100 |
| | (b) EG8180 | 120 | 120 | | 120 | 120 | 10 | 550 | 120 | | |
| | (b) BC08AHA | | | 120 | | | | | | | |
| | EV150 for comparison | | | | | | | | | 120 | |
| | WK307 for comparison | | | | | | | | | | 120 |
| | (c) PW-90 | 100 | 100 | 100 | 30 | 0 | 100 | 100 | 350 | 100 | 100 |
| | (d) zinc oxide | | 20 | | | | | | | | |
| Evaluation Result | Specific gravity | 0.92 | 0.92 | 0.92 | 0.93 | 0.93 | 0.93 | 0.91 | 0.92 | 0.9 | 0.93 |
| | Hardness (Shore A) | 73 | 74 | 86 | 95 | 40*1 | 72 | 67 | 52 | 77 | 82 |
| | Anti-blocking property | G | G | G | E | E | B | G | B | B | B |
| | Oil bleeding resistance | G | G | G | G | G | B | G | B | B | B |
| | Productivity-1 | G | G | G | G | G | B | G | G | B | B |
| | Productivity-2 | E | E | E | G | G | E | E | E | G | G |
| | Productivity-3 | E | E | E | E | G | B | E | E | G | G |
| | Properties of the thermoplastic elastomer compositions*2 | G | G | G | G | G | — | B | — | B | B |

*1 Shore D value
*2 G: Both evaluation results in Table 2 were good, and B: one or both evaluation results were poor.

Examples 6 through 13 and Comparison Examples 6 through 10

Using the resin compositions obtained in Examples 1 through 5 and in Comparative Example 2, 4 and 5, thermoplastic elastomer compositions were prepared in Examples 6 through 13 and Comparative Examples 6 through 8. In Comparative Example 9, use was made of the phenol resin (Tackirol 201) as component (a) of the present invention instead of the resin composition; and in Comparative Example 10, a master batch comprising a phenol resin and butyl rubber (Tackirol 201 MB35: containing 35 wt % of butyl rubber, 30 wt % of a non-brominated phenol resin and 35 wt % of clay) as a resin composition to prepare thermoplastic elastomer compositions. The components shown in Table 2 in the quantities shown in Table 2 were placed in a 3 L pressure kneader type mixer and melt kneaded at a setup temperature of 170° C. for 10 minutes. The thermoplastic elastomer compositions obtained were subjected to the aforementioned tests (8) and (9). The results are as shown in Table 2.

TABLE 2

| | | \multicolumn{8}{c|}{Thermoplastic Elastomer Compositions} | | | | | | | |
|---|---|---|---|---|---|---|---|---|---|
| | | Ex. 6 | Ex. 7 | Ex. 8 | Ex. 9 | Ex. 10 | Ex. 11 | Ex. 12 | Ex. 13 |
| Component | EPDM (1) | 100 | 100 | 100 | 100 | 100 | 100 | 100 | 100 |
| | PP (2) | 100 | 100 | 100 | 100 | 100 | 100 | 100 | 100 |
| | Paraffin oil (3) | 120 | 120 | 120 | 120 | 120 | 120 | 120 | 120 |
| | Resin composit. | 32 (Ex. 1)* | 34 (Ex. 2)* | 32 (Ex. 3)* | 32 (Ex. 1)* | 32 (Ex. 1)* | 32 (Ex. 1)* | 25 (Ex. 4)* | 22 (Ex. 5)* |
| | Phenol resin Master batch | | | | | | | | |
| | SEEPS (4) | | | | 30 | 30 | | | |
| | Organic peroxide (5) | | | | | | 0.1 | | |
| | Zinc oxide (6) | | | | | | | 2 | |
| Evaluation Results | Compress. Set, % (120° C., 22 hours) | 42 | 37 | 44 | 36 | 35 | 36 | 40 | 41 |
| | Uniformity (number of hard spots) | 2 | 5 | 1 | 4 | 5 | 8 | 0 | 0 |

*Composition prepared in this Example

| | | Comp. Ex. 6 | Comp. Ex. 7 | Comp. Ex. 8 | Comp. Ex. 9 | Comp. Ex. 10 |
|---|---|---|---|---|---|---|
| Component | EPDM (1) | 100 | 100 | 100 | 100 | 100 |
| | PP (2) | 100 | 100 | 100 | 100 | 100 |
| | Paraffin oil (3) | 120 | 120 | 120 | 120 | 120 |
| | Resin composition | 75 (Comp. Ex 2)* | 32 (Comp. Ex 4)* | 32 (Comp. Ex 5)* | | |
| | Phenol resin Master batch containing the phenol resin and butyl rubber | | | | 10 | 29 |
| | SEEPS (4) | | | | | |
| | Organic peroxide (5) | | | | | |
| | Zinc oxide (6) | | | | | |
| Evaluation Result | Compression set, % (120° C., 22 hours) | 71 | 48 | 46 | 41 | 52 |
| | Uniformity of cross-linking (number of hard spots) | 1 | 21 | 18 | 45 | 36 |

*Composition prepared in this Comparison Example

The resin compositions of the present invention prepared in Examples 1 through 5 demonstrated the excellent anti-blocking property and oil bleeding resistance as seen in Table 1, and could be pelletized easily. The resin compositions prepared in Examples 1 through 3 which contained component (c) in the amount of from 50 to 300 parts by weight demonstrated the better productivity. The resin compositions prepared in Examples 4 and 5 which contained component (c) in the amount less than 50 parts by weight demonstrated the better anti-blocking property and also gave the fewer number of hard spots in the thermoplastic elastomer compositions (Examples 12 and 13). As seen in Table 2, the resin compositions of the present invention demonstrated uniform cross-linking, and the compression set of the thermoplastic elastomer compositions obtained was improved so that they were useful as a master batch of the cross-linking agent.

In contrast, the resin compositions prepared in Comparative Examples 1 and 2 contained component (b) in the range out of the range specified in the present invention. As seen in Table 1, the resin composition in Comparative Example 1 which contained component (b) in the amount less than the lower limit gave the poor anti-blocking property and oil bleeding resistance as well as the poor productivity. Therefore, it was not suitable as a master batch of the cross-linking agent. As seen in Table 2, the resin composition in Comparative Example 2 which contained component (b) in the amount more than the upper limit gave the thermoplastic elastomer composition which demonstrated the inferior compression set (Comparative Example 6). Comparative Example 3 shows the resin composition prepared with component (c) of the amount larger than 300 parts by weight. Although the production (pelletization) was possible, blocking (adhesion) of the pellets occurred due to oil bleeding. Therefore, the adhesion must be loosened in order to use this product as a master batch of the cross-linking agent, which required extra work in handling.

In Comparative Examples 4 and 5, comparative components (b), ethylene-vinyl acetate copolymer and ethylene-methyl methacrylate copolymer, were used instead of component (b), respectively. As seen in Table 1, the anti-blocking property and oil bleeding resistance were worse and adhesion to the kneading machine occurred. As seen in Table 2, the thermoplastic elastomer compositions prepared using the resin compositions prepared in Comparative Examples 4 and 5 demonstrated the worse compression set and the molded products showed more hard spots (Comparative Examples 7 and 8).

In Comparative Example 9, the phenol resin alone was used instead of a composition in the dynamic cross-linking of the thermoplastic elastomer composition. The phenol resin was hard and brittle, so that it must be scraped out using a metal spatula before used. Further, the generation of powder dust was always of concern during the operations. Moreover, as seen in Table 2, uniform cross-linking was not achieved in the thermoplastic elastomer composition obtained.

In Comparative Example 10, a phenol resin master batch containing butyl rubber was used instead of the resin composition of the present invention. The master batch containing butyl rubber was of a brick-like shape, so that it must be finely chopped using a guillotine cutter before used, which required extra work during the operations. Further, as seen in Table 2, uniform cross-linking was not achieved with the master batch containing butyl rubber.

The invention claimed is:

1. A method for preparing a master batch of a phenol resin cross-linking agent, comprising mixing:
    (a) 100 parts by weight of at least one compound selected from the group consisting of phenol resins and brominated phenol resins,
    (b) 20 to 500 parts by weight of a crystalline olefin resin, provided that copolymers of ethylene with unsaturated carboxylic acid ester or vinyl acetate are precluded, wherein the crystalline olefin resin is at least one selected from the group consisting of ethylene homopolymers, propylene homopolymers, ethylene-α-olefin copolymers and propylene-α-olefin copolymers, and
    (c) 0 to 300 parts by weight of a non-aromatic softening agent for rubber.

2. The method for preparing a master batch of a phenol resin cross-linking agent as described in claim 1 wherein the quantity of component (c) is from 50 to 300 parts by weight.

3. The method for preparing a master batch of a phenol resin cross-linking agent as described in claim 1 wherein the quantity of component (c) is less than 50 parts by weight.

4. The method for preparing a master batch of a phenol resin cross-linking agent as described in claim 1 wherein component (a) is an alkylphenol formaldehyde resin.

5. The method for preparing a master batch of a phenol resin cross-linking agent as described in claim 1, wherein the composition further contains a cross-linking promoter (d) in an amount of 200 parts by weight or less.

6. A method for preparing a rubber composition or thermoplastic composition, comprising: melt kneading 100 parts by weight of rubber with 1 to 280 parts by weight of the master batch of claim 1.

7. The method for preparing a rubber composition or thermoplastic composition of claim 6, wherein a crystalline olefin resin in an amount of 400 parts by weight or less is melt kneaded with the rubber and the master batch.

8. The method for preparing a rubber composition or thermoplastic composition of claim 6, wherein a cross-linking promoter in an amount of 200 parts by weight or less per 100 parts by weight of component (a) is melt kneaded with the rubber and the master batch, provided that if the resin composition comprises component (d), a total amount of the cross-linking promoter and component (d) is 200 parts by weight or less per 100 parts by weight of component (a).

9. The method for preparing a rubber composition or thermoplastic composition of claim 6, wherein a non-aromatic softening agent for rubber in an amount of 800 parts by weight or less is melt kneaded with the rubber and the master batch.

10. The method for preparing a rubber composition or thermoplastic composition of claim 6, wherein at least one polymer selected from the group consisting of copolymers of an aromatic vinyl compound with a conjugated diene and their hydrogenated derivatives, and hydrogenated derivatives of conjugated diene polymers in an amount of 200 parts by weight or less is melt kneaded with the rubber and the master batch.

11. The method for preparing a rubber composition or thermoplastic composition of claim 6, wherein an organic peroxide in an amount of 0.01 to 0.5 part by weight is melt kneaded with the rubber and the master batch.

* * * * *